United States Patent
Skog et al.

(10) Patent No.: US 6,330,445 B1
(45) Date of Patent: Dec. 11, 2001

(54) METHOD AND SYSTEM FOR ROUTING OF A USSD MESSAGE

(75) Inventors: Robert Bengt Skog, Sollentuna; Bo Arne Valdemar Åström, Hägersten; Peter Hans Edlund, Tumba, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/259,268

(22) Filed: Mar. 1, 1999

(51) Int. Cl.[7] ......................................................... H04Q 7/22
(52) U.S. Cl. ............................ 455/433; 455/439; 455/445
(58) Field of Search .................................... 455/433, 439, 455/445, 456

(56) References Cited

U.S. PATENT DOCUMENTS

| | | | |
|---|---|---|---|
| 5,835,856 | * 11/1998 | Patel | 455/406 |
| 5,930,701 | * 7/2000 | Skog | 455/415 |
| 6,018,660 | * 1/2000 | Alperovich et al. | 455/433 |
| 6,052,591 | * 4/2000 | Bhatia | 455/445 |
| 6,064,882 | * 5/2000 | Coyne et al. | 455/428 |
| 6,104,931 | * 8/2000 | Havinis et al. | 455/456 |

FOREIGN PATENT DOCUMENTS

| | | |
|---|---|---|
| WO97/46035 | * 12/1997 | (WO) . |
| WO98/26615 | * 6/1998 | (WO) . |
| WO9827782 | 6/1998 | (WO) . |

* cited by examiner

*Primary Examiner*—Daniel Hunter
*Assistant Examiner*—Thuan T. Nguyen
(74) *Attorney, Agent, or Firm*—Burns, Doane, Swecker & Mathis, L.L.P.

(57) ABSTRACT

A system and method are provided for routing of a USSD message directly from an MSC/VLR to an external node. When a mobile station user enters a service code which the mobile station does not recognize as being associated with a known supplementary service, the mobile station forms a USSD message containing the service code which is sent to a MSC/VLR. If the MSC/VLR determines that the service code is one that is associated with an application residing in an external node, then the MSC/VLR routes the USSD message directly to the external node. Various methods and techniques can be used to provide the address of the external node to the MSC/VLR.

24 Claims, 8 Drawing Sheets

FIG. 10

METHOD AND SYSTEM FOR ROUTING OF A USSD MESSAGE

BACKGROUND

The present invention is directed generally to radiocommunication systems and methods and, more particularly, to systems and methods involving so-called supplementary services in radiocommunication systems.

The growth of commercial communication systems and, in particular, the explosive growth of cellular radiotelephone systems, have compelled system designers to search for ways to increase system capacity without reducing communication quality beyond consumer tolerance thresholds. One technique to achieve these objectives involved changing from systems, wherein analog modulation was used to impress data onto a carrier wave, to systems wherein digital modulation was used to impress the data on carrier waves. As these systems continue to develop and expand, subscribers' demand for additional services and functionality from their radiocommunication systems also continues to grow.

Figure 1:
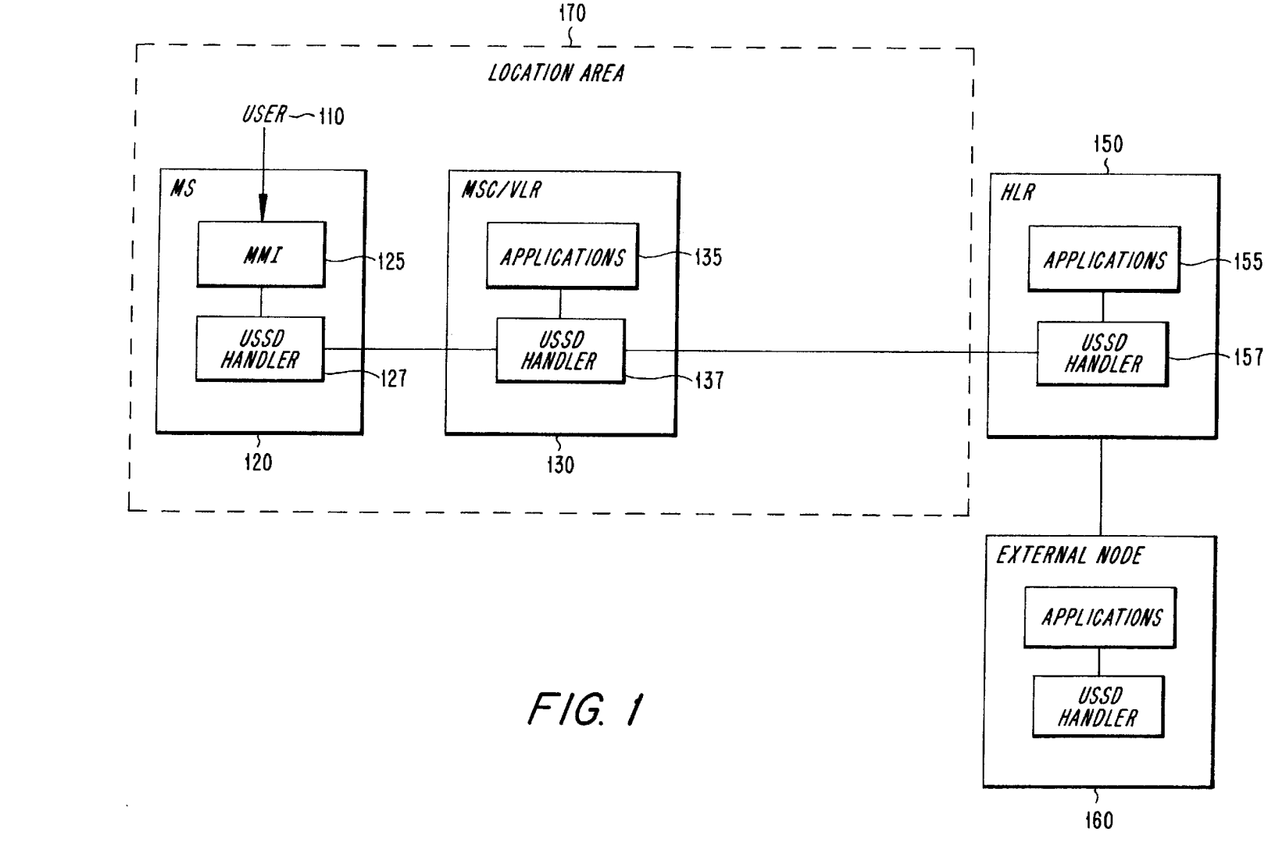
FIG. 1 illustrates the routing of USSD messages through the HLR to an external node in a cellular radiocommunication system.

To provide some context within which to discuss the present invention, consider FIG. 1 which generally illustrates an exemplary radiocommunication system as specified by the Global System for Mobile communication (GSM) standard. In the network 100, a user 110 operates a mobile station (MS) 120 to access the GSM network 100. The basic operation of the GSM network is well-known and, therefore, unnecessary details related to this system are omitted. When the MS 120 enters an area 170 supported by a particular mobile switching center/visitor location register (MSC/VLR) 130, it will register therewith as a new visitor. As part of the registration process, the home location register (HLR) 150 associated with user 110 sends a copy of the relevant subscriber data, e.g., including the supplementary services to which this particular user has subscribed, to the MSC/VLR 130. The subscriber data is sent from HLR 150 to MSC/VLR 130 using an Insert Subscriber Data command in accordance with the MAP protocol defined by the GSM standards.

The GSM standard provides a wide range of supplementary services, e.g., call barring, call forwarding, etc. These services can be accessed by entering a specific text string associated with a particular supplementary service into MS 120. For example, if user 110 entered the text string **21*1234567# into MS 120 and pushed SEND, **21 would be recognized as being associated with the call forwarding supplementary service and would divert all incoming calls to the number 1234567.

Normally, when standard GSM supplementary services are managed from the mobile station, structured functional signaling is available. For example, if the user activates the supplementary service Call Forward, the mobile station recognizes the service code as being associated with the Call Forwarding supplementary service and invokes a standard signaling procedure towards the network. This is because the Call Forwarding supplementary service and its corresponding service code are defined by the GSM standard.

Since the supplementary services were introduced in stages into the GSM standard, there was a risk that a user would try to invoke a supplementary service that was not yet implemented, i.e., enter a service code which does not have a defined associated supplementary service. To deal with this situation the unstructured supplementary service data (USSD) operation was introduced into the GSM standard as a mechanism to contain the service code for delivery through the network to the node which supports the supplementary service which corresponds to the service code. Accordingly, the USSD operation is used when the mobile station does not recognize the service code which is entered by the user.

GSM technical standard 02.90 defines, inter alia, stage 1 standards for USSD, which portion of the GSM standard is herein incorporated by reference. An exemplary USSD man-machine interface string format is "*#SC*<data>#", wherein SC stands for the service code and the data field is a text string which can contain any number of characters. The aforementioned standard reserves three digits for the service code, wherein service codes in the range of 150–199 are referred to as visited public land mobile network (VPLMN) service codes and are intended to invoke applications located in the MSC where the mobile station is currently located, regardless of whether the MSC is located in the mobile station user's home PLMN (HPLMN). Service codes in the range of 100–149 are called HPLMN service codes and are intended to invoke applications which are located in the HLR associated with the user of the mobile station. Recent proposals to the GSM standard for USSD include replacing the alphanumerical service code with a binary coded network element identifier (NEI) to be used when routing USSD messages through the network.

The handling of the USSD operation according to conventional systems is illustrated in FIG. 1. The user 110 enters a service code and text string using a keypad (not shown) on MS 120. USSD Handler 127 in MS 120 analyzes the service code to determine whether the USSD Handler 127 recognizes the service code. If the service code is not recognized by USSD Handler 127, then a USSD message containing the service code and text string is sent from MS 120 to MSC/VLR 130. MSC/VLR 130 uses USSD Handler 137 to determine whether the service code is recognized, i.e., whether the service code is in the range of 150–199. If the USSD Handler 137 recognizes the service code, then the supplementary service application 135 (herein referred to as application) which corresponds to the service code is performed by MSC/VLR 130. If the service code is not recognized, then the MSC/VLR 130 passes the service code to HLR 150.

In HLR 150, USSD Handler 157 analyzes the service code to determine whether a corresponding application is defined within HLR 150. If USSD Handler 157 does not recognize the service code as one which corresponds to an application residing in HLR 150, the USSD Handler 157 determines to which external node the USSD message is directed. For simplicity of illustration, only a single external node 160 is illustrated. Accordingly, the USSD Handler 157 determines that the USSD message is directed to external node 160, and sends the USSD message to the node. The external node 160 analyzes the service code in the USSD message and invokes the application residing in the external node which corresponds to the service code. For a more detailed description of the afore described procedure, the interested reader should refer to U.S. Pat. No. 5,752,188 issued to Åström et al., which is herein incorporated by reference.

According to the above described system, a user 110 can access supplementary services in an external node 160. However, it is not possible to route USSD operations directly from MSC/VLR 130 to external nodes without first sending the message to the subscriber's HLR. This leads to increased capacity demands on the HLR. Further, conventional systems fail to provide geographically selective USSD service, i.e., a USSD application that is accessed via the same service code but behaves differently depending upon the location of the subscriber. Conventional systems also fail to store the applications used to support these services on a subscriber basis, i.e., as part of the data stored per subscriber in the VLR. Accordingly, a subscriber entering the same service code in different PLMNs will invoke different applications.

SUMMARY

According to exemplary embodiments of the present invention, USSD operations can be directly routed from an MSC/VLR to an external node, without passing through the HLR. When a mobile subscriber enters into a mobile station a service code which is not associated with a known supplementary service, the mobile station will send a USSD message containing the service code to the MSC/VLR associated with the area where the mobile station is currently located. The MSC/VLR can then route the USSD message directly to an external node where the application associated with the service code entered by the mobile subscriber is located. Various methods and techniques are described for informing the MSC/VLR of the address of the external node. According to an exemplary embodiment, the address information can be supplied by the mobile station to the MSC/VLR. According to another exemplary embodiment, the mobile station can supply information to the MSC/VLR which then uses a Domain Name Server to obtain the address of the external node. According to another exemplary embodiment of the present invention, the address information can be obtained by the MSC/VLR from the HLR associated with the subscriber. According to yet another exemplary embodiment, the address information is obtained from a CAMEL server. According to a still further exemplary embodiment of the present invention, the address of the external node can be retrieved from a database in the MSC/VLR.

Through the use of various techniques and methods described herein, the direct routing of USSD messages reduces the load on HLR. Further, the present invention allows the provision of geographically selective supplementary services.

BRIEF DESCRIPTION OF THE DRAWINGS

The present invention will now be described with reference to the accompanying drawings, wherein like reference numerals in the various figures are utilized to designate like components, in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Figure 2:
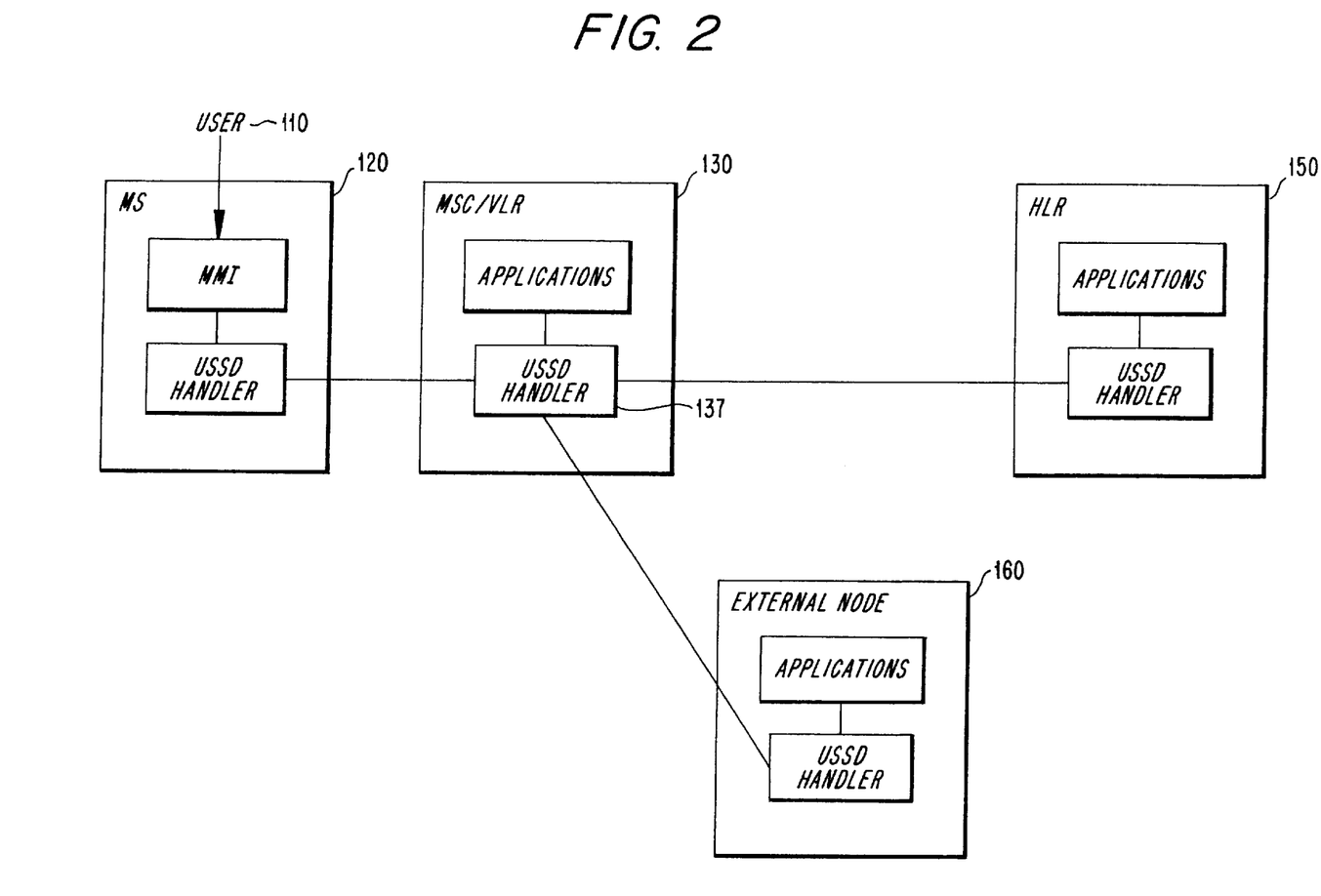
FIG. 2 illustrates the routing of USSD messages through an MSC/VLR to an external node.

FIG. 2 illustrates an exemplary embodiment of the basic operation of the present invention. To provide some structure to this discussion, note that supplementary services can be implemented by way of software applications in communication systems. The applications may reside in one or more different nodes. For example, some applications may reside on a node and have a service code within the VPLMN range (referred to herein as "VPLMN applications"), while some applications may reside on a node and have a service code within the HPLMN range (referred to herein as "HPLMN applications"). Routing of requests by a user to invoke a particular supplementary service will, at least in part, depend upon whether that service is associated with a VPLMN application or an HPLMN application.

For example, when user 110 wishes to invoke a service, the user would enter the corresponding service code for processing by the MS 120. If the service code is not defined in MS 120, then MS 120 will create a USSD message containing the service code and send the USSD message to MSC/VLR 130. Note that although the MSC and VLR are described herein as a single node, one skilled in the art will recognize that the MSC and the VLR can be implemented as separate nodes in the communication system. In such cases, exemplary embodiments of the present invention will operate in the same manner as described herein except that the MSC and/or the VLR can directly route USSD messages.

In any event, upon receipt of the USSD message at the MSC/VLR 130, the USSD Handler 137 analyzes the USSD message and the service code. If the USSD Handler 137 cannot determine the location (i.e., address) of the application which the USSD message is attempting to invoke, the USSD message can be sent to HLR 150 (e.g., if the requested service is associated with an HPLMN application) or the HLR 150 can be queried to attempt to determine the address. However, if USSD Handler 137 determines that the USSD message is directed to an external node 160, i.e., if USSD Handler 137 recognizes the address of the application, then the USSD Handler 137 will directly forward the USSD message to that external node 160.

In order for the MSC/VLR to directly route the USSD message to an external node, the MSC/VLR must be able to determine the address of the external node wherein the application(s) resides that corresponds to the service code entered by the user. According to exemplary embodiments of the present invention, there are at least four different methods which the MSC/VLR 130 uses to determine the address of the external node. The first method involves a database of external node addresses located in the MSC/VLR, the second method involves including the external node address in the USSD message, the third method involves including information in the USSD message which is sent to another node which looks up the corresponding external node address, and the fourth method involves the MSC/VLR querying another node for the address of the external node whenever the MSC/VLR does not recognize the service code. In these ways, although a message may contain a service code which is associated with an HPLMN application, the MSC/VLR can route the USSD message directly to the external node without routing the USSD message to the HLR.

Figure 3:
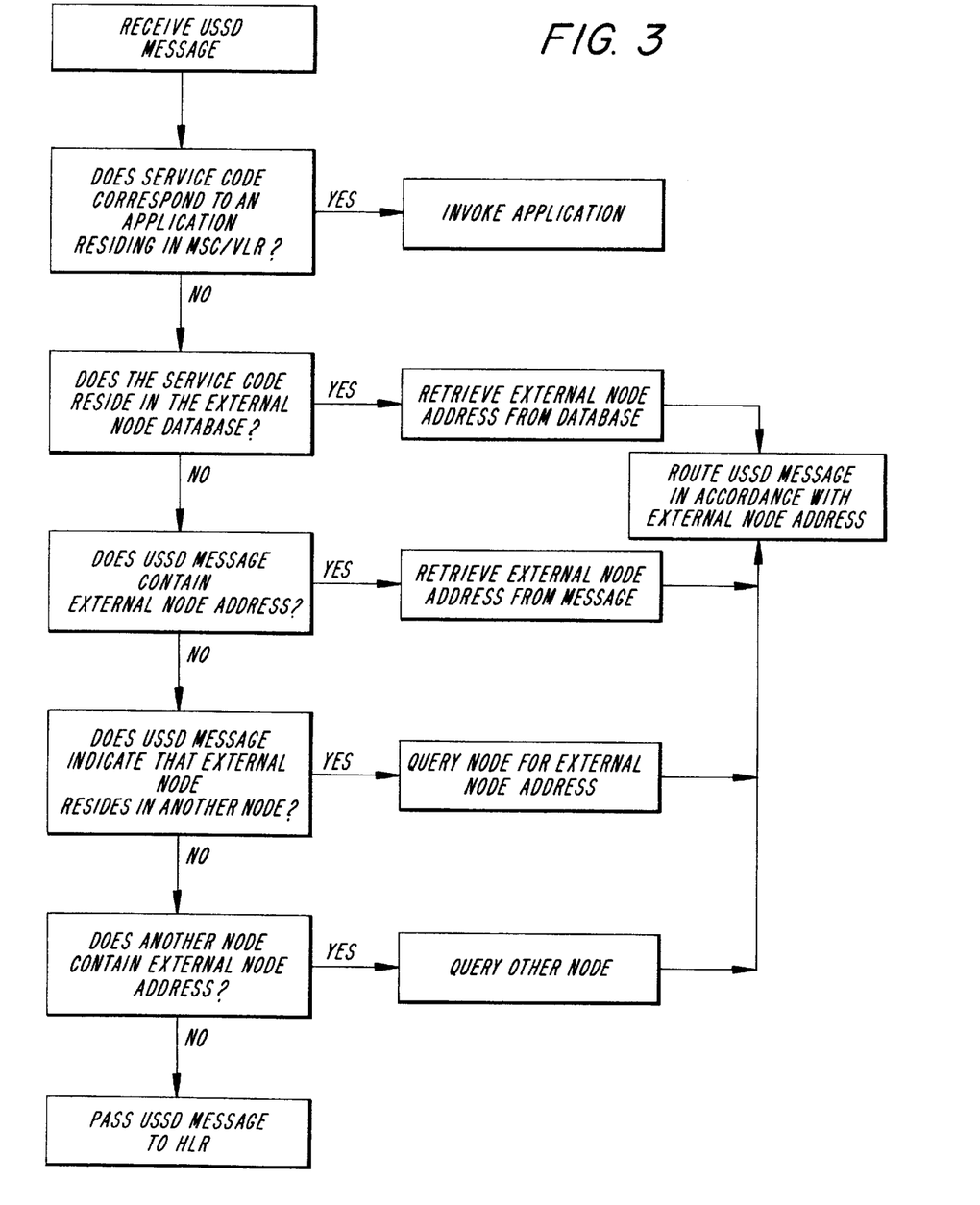
FIG. 3 illustrates an exemplary method for analyzing USSD messages in an MSC/VLR.

FIG. 3 illustrates an exemplary method performed by the MSC/VLR in order to route a USSD message to the correct node. Note that the steps depicted in FIG. 3 can be performed in any order and that any subset of these steps can be omitted. Accordingly, in step 305 the MSC/VLR receives a USSD message. In step 310 the USSD Handler in the MSC/VLR analyzes the USSD message to determine whether the service code corresponds to an application residing in the MSC/VLR. If the service code corresponds to an application residing in the MSC/VLR, in accordance with the YES path out of decision step 310, then the MSC/VLR invokes the application, in accordance with step 315. However, if the service code does not correspond to an application residing in the MSC/VLR, in accordance with the NO path out of decision step 310, then the MSC/VLR uses a database containing service codes and the corresponding external node addresses to analyze the service code in the USSD message. Accordingly, in step 320, the MSC/VLR determines whether the service code corresponds to a service code in the MSC/VLR external node address database. If a corresponding service code is found in the MSC/VLR external node database, in accordance with the YES path out of decision step 320, then the MSC/VLR retrieves the external node address which corresponds to the service code, in accordance with step 325. Once the MSC/VLR retrieves the address of the external node, the MSC/VLR routes the USSD message in accordance with the external node address, in accordance with step 370.

If the service code does not reside in the external node database, in accordance with the NO path out of decision step 320, then the USSD Handler in the MSC/VLR will examine the USSD message to determine whether the message contains an external node address. If the USSD message contains an external node address, in accordance with the YES path out of decision step 330, then the USSD Handler will retrieve the external node address from the message, in accordance with step 335. In step 370, the USSD message is routed in accordance with the external node address contained in the USSD message.

If, after examination by the USSD Handler, it is determined that the USSD message does not contain the address of the external node, it is determined whether the USSD message indicates that the external node address resides in a database node. As will be described below, the USSD message will indicate that the external node address resides in a database node if the USSD message contains information identifying the external node which requires translation by the database node. Accordingly, if it is determined that the USSD message indicates that the external node address resides in the database node, in accordance with the YES path out of decision step 340, then the database node is queried for the external node address, in accordance with step 345. The query to the database node will contain the aforementioned identifying information. Then, in step 370, the USSD message is routed in accordance with the external node address.

If the USSD message does not indicate that an external node address resides in another node, in accordance with the NO path out of decision step 340, then the MSC/VLR determines whether another node (e.g., the HLR or a CAMEL node) should be queried to obtain the external node address, in accordance with step 350. For example, if the subscriber associated with the USSD message is a CAMEL subscriber, then the MSC/VLR may, at step 350, opt to query the CAMEL server for the external node address rather than forward the USSD message to the HLR. After the another node is queried in step 355, the USSD message is routed in accordance with the external node address retrieved from the another node, in accordance with step 370. If it is determined that another node does not contain an external node address corresponding to the service code, in accordance with the NO path out of decision step 350, then it is determined whether the service code indicates that the application resides in the HLR, in accordance with step 360. If so, then the USSD message is routed to the HLR at step 362. Step 362 represents the conventional techniques described in the aforementioned Åström patent. If none of the previous steps in FIG. 3 results in routing of the USSD message, then the flow proceeds to step 364 where an error message is generated.

According to the first method for obtaining an external node address, the operator of the mobile system will introduce a function in the MSC/VLR which can look-up the address of the external node based on the service code in the USSD message. Therefore, when an MSC/VLR receives a USSD message, the USSD Handler will analyze the service code and determine whether the service code is included in the database. Accordingly, it is necessary to provide the MSC/VLR with service codes and their corresponding external node addresses.

Figure 4:
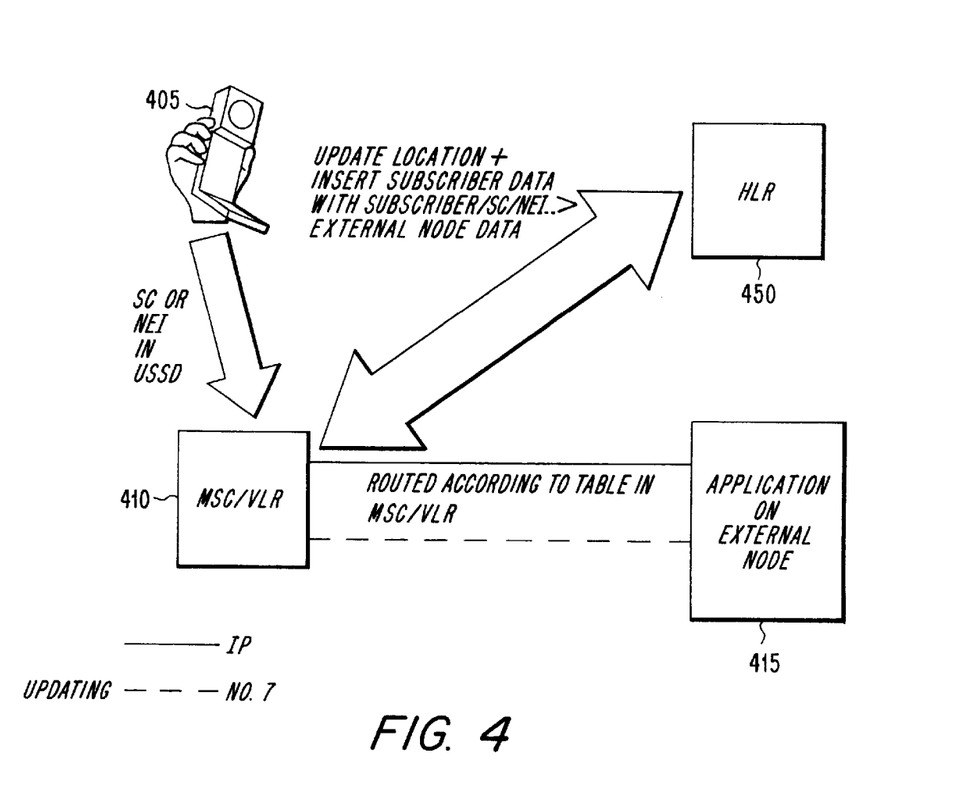
FIG. 4 illustrates a first exemplary method for providing an external node address to an MSC/VLR.

FIG. 4 illustrates a first method for providing the external node addresses and the corresponding service codes to the MSC/VLR. As described above, when a mobile station enters a new location area, i.e., an area associated with a new MSC/VLR, the MSC/VLR will send an Update Location Information command to the HLR associated with the mobile station. The Update Location Information command informs the HLR of where the mobile station is currently located and requests that certain subscriber specific information be sent to the MSC/VLR. In response to the Update Location command the HLR will send the subscriber data to the MSC/VLR using an Insert Subscriber Data command. According to the exemplary embodiment illustrated in FIG. 4, the HLR 450 will send the external node address to the MSC/VLR 410 in the Insert Subscriber Data command, as illustrated by the arrow pointing from the HLR 450 to the MSC/VLR 410. When the user of mobile station 405 enters the service code (SC) or NEI, the mobile station will send the SC or NEI to MSC/VLR 410. Since the address of the external node 415 has already been sent to the MSC/VLR 410 and stored therein, the MSC/VLR 410 will be able route the USSD message to the external node 415 upon receipt of the SC or NEI.

Figure 5:
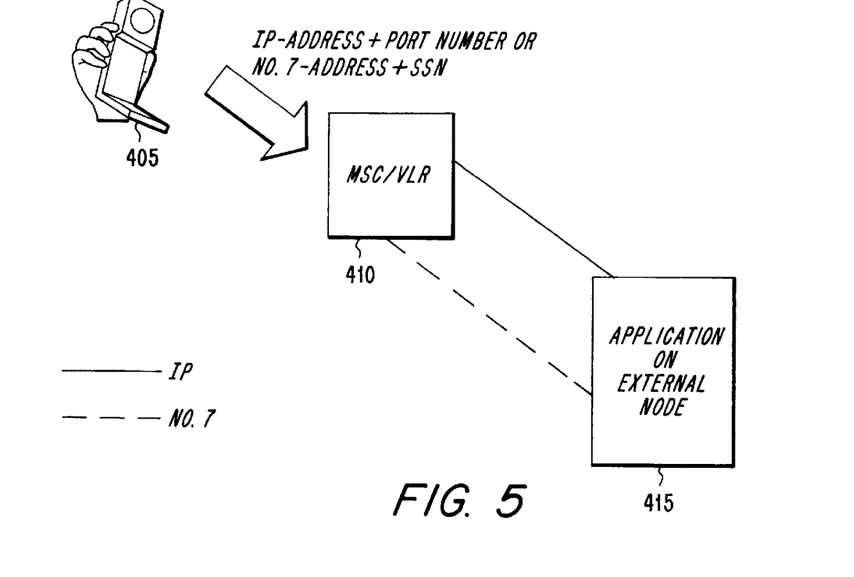
FIG. 5 illustrates a second exemplary method for providing an external node address to an MSC/VLR.

FIG. 5 illustrates a second method for providing the MSC/VLR with the external node address, wherein the address of the external node 415 is contained in the USSD message from mobile station 405. Accordingly, the mobile station 405 can deliver in the USSD message to the MSC/VLR 410, the Internet Protocol (IP) Address and a port number. The IP address is a 32-bit number that identifies the receiver of the information and the port number is a way to identify a specific process to which a message is to be forwarded when it arrives at a server. Alternatively, the mobile station 405 can deliver the CCITT No.7 Signaling System address together with the SubSystem number (SSN).

Figure 6:
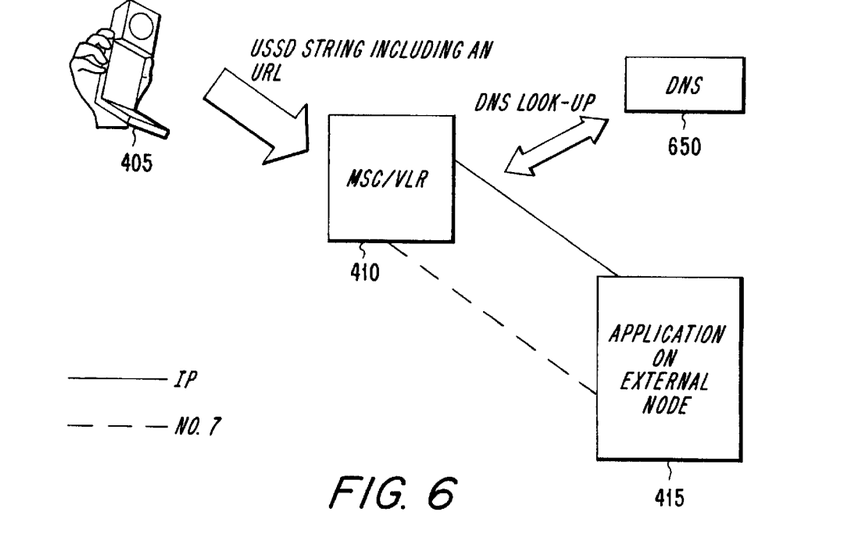
FIG. 6 illustrates a third exemplary method for providing an external node address to an MSC/VLR.

FIG. 6 illustrates a third method for delivering the external node address to the MSC/VLR 410, wherein the USSD message contains information identifying the external node which requires translation for routing by the MSC/VLR 410. According to an exemplary embodiment of the present invention, the mobile station 405 delivers a Uniform Resource Locator (URL) identifying the external node 415, in the USSD text string. A URL is typically used to provide the address of a file or resource on the Internet, although it need not necessarily identify a resource on the Internet. When the MSC/VLR 410 receives the URL, the MSC/VLR 410 sends the URL to a domain name server (DNS) 650 which looks up the IP address corresponding to the URL. The DNS 650 returns the IP address to the MSC/VLR 410, which then routes the USSD message to the correct external node 415.

Figure 7:
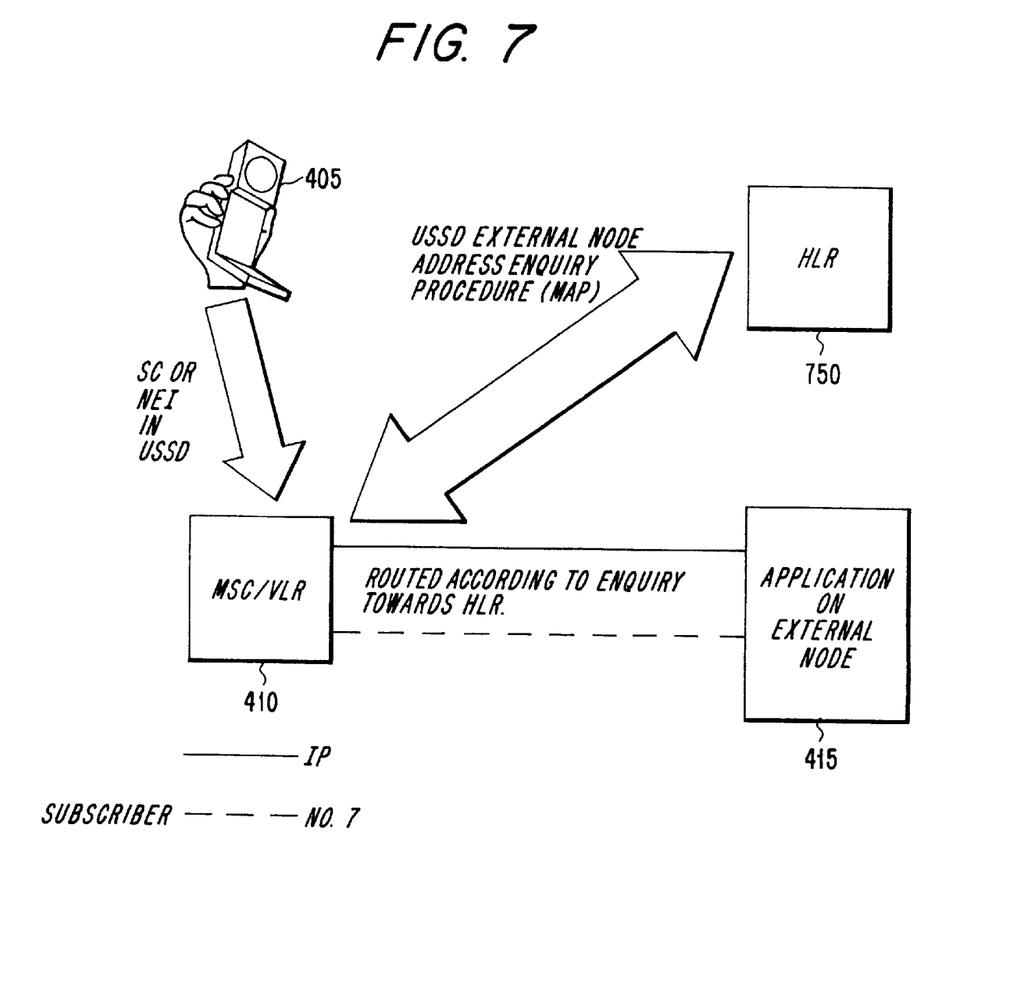
FIG. 7 illustrates a fourth exemplary method for providing an external node address to an MSC/VLR.
Figure 8:
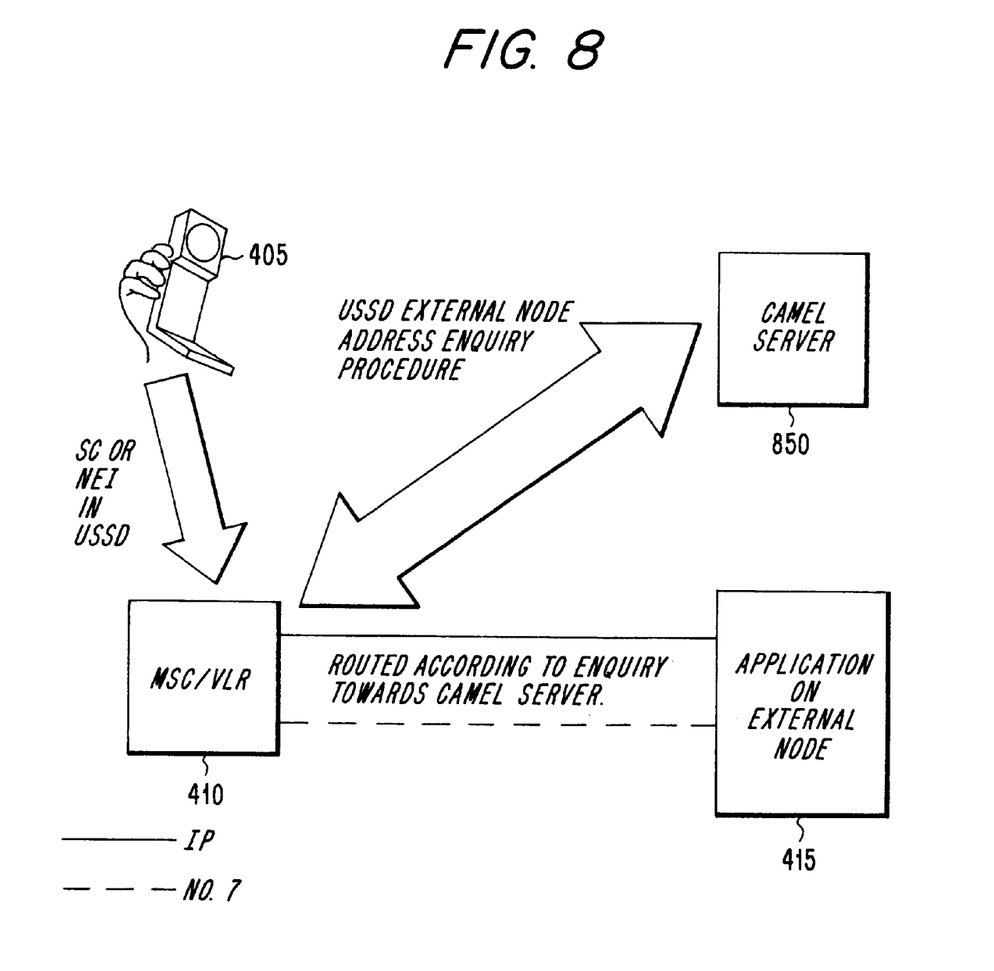
FIG. 8 illustrates an alternate embodiment of the fourth exemplary method for providing an external node address to an MSC/VLR.

FIGS. 7 and 8 illustrate alternate methods for providing the external node address to the MSC/VLR in accordance with the fourth method mentioned above. FIG. 7 illustrates a method for obtaining the address of an external node by querying the HLR 750. A mobile subscriber who wishes to invoke an application which is residing in an external node, enters the service code or the NEI which corresponds to the desired USSD application. The mobile station 405 inserts the service code or the NEI into the USSD message which is sent to the MSC/VLR 410. According to the embodiment illustrated in FIG. 7, a new MAP command is defined which is used to obtain the address information of the external node from the HLR 750. According to a purely exemplary embodiment, the new MAP command is called the USSD External Node Address Enquiry command. In response to the MAP command, the HLR 750 retrieves the address of the external node which contains the application corresponding to the service code or NEI and sends the external node address to the MSC/VLR 410. The MSC/VLR 410 routes the USSD message to the correct external node based upon the address supplied by the HLR 750.

FIG. 8 illustrates an alternate method for retrieving an external node address by querying a CAMEL server. CAMEL is a service which enables a GSM network operator to provide intelligent network services to cellular subscribers. Accordingly, if a subscriber is a CAMEL subscriber, i.e., subscribes to services which require CAMEL, then the address to the relevant CAMEL server is stored in the HLR. This address is sent to the MSC/VLR in an Insert Subscriber Data operation when the subscriber registers at the MSC/VLR. The mobile station 405 inserts the service code or NEI which corresponds to the subscribers desired application, into the USSD message sent to the MSC/VLR 410. The USSD Handler (not shown) in the MSC/VLR 410 uses a CAMEL subscriber 1 (CS1) Initial Data Point (IDP) operation to query the CAMEL server 850. The CAMEL server 850 returns the address of the external node to MSC/VLR 410. Based upon the address provided by the CAMEL server 850, the MSC/VLR 410 will route the USSD message to the desired external node 415.

Figure 9:
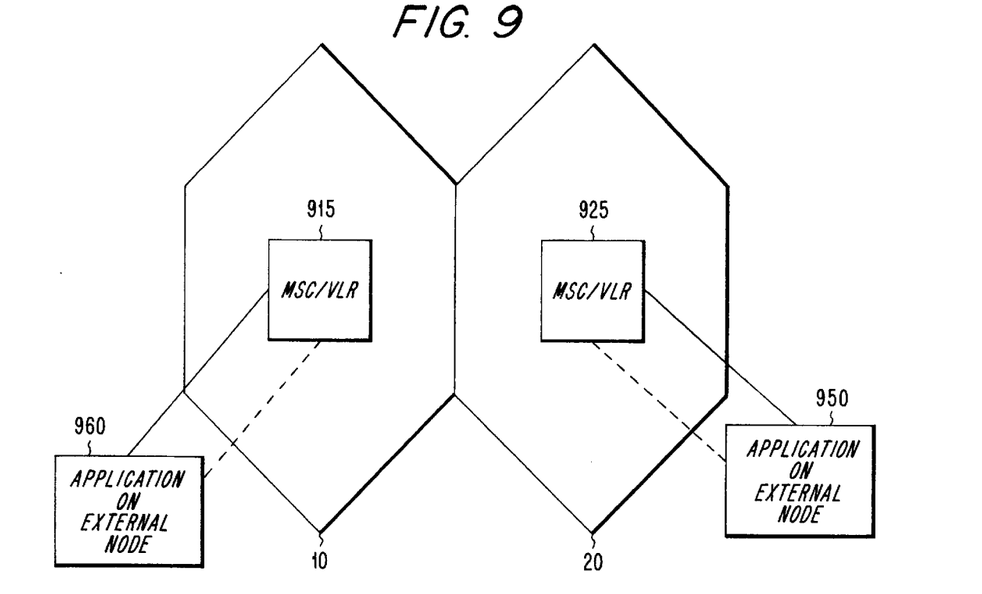
FIG. 9 illustrates an exemplary embodiment of geographically selective applications.
Figure 10:
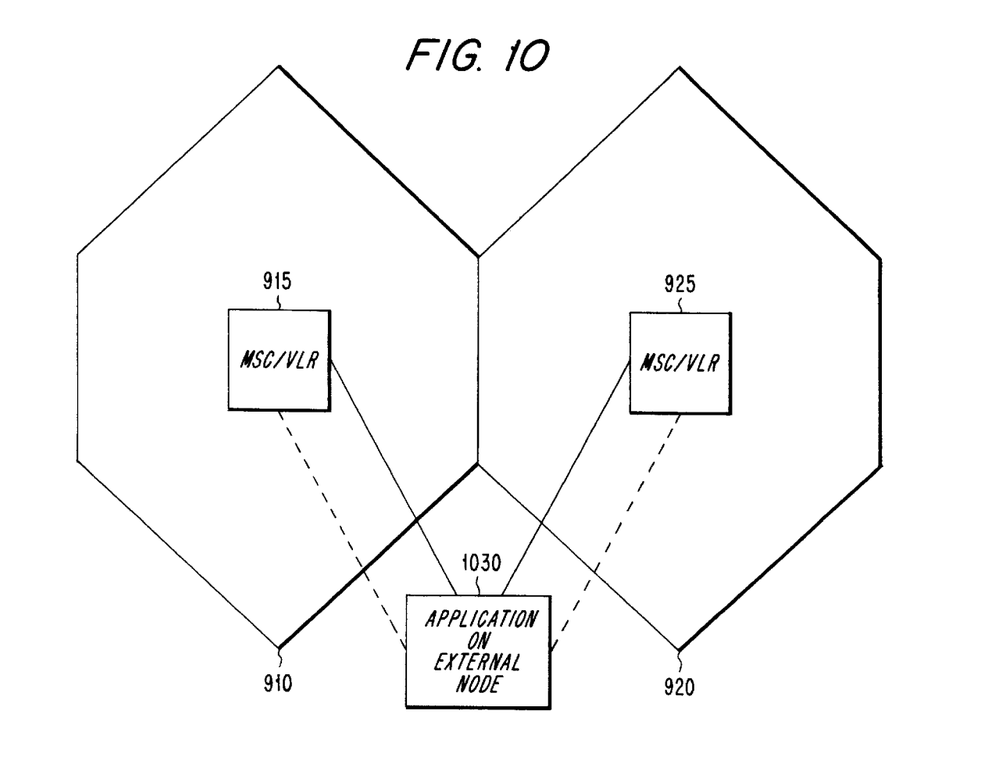
FIG. 10 illustrates an alternate exemplary embodiment of the implementation of geographically selective applications.

Using the afore described techniques, the MSC/VLR can be provided with the address of an external node and the MSC/VLR can directly route a USSD message to an external node. Accordingly, the provision of direct routing from an MSC/VLR affords new functionality to a mobile subscriber which is not possible without the direct routing. FIGS. 9 and 10 illustrate the implementation of public services, i.e., services which invoke the same application regardless of which subscriber is invoking the application, in a geographically selective manner. For instance, suppose that the mobile system operator designates the service code *22 to correspond with a bus time table application. In FIG. 9, MSC/VLR 915 has an associated area of coverage 910, and MSC/VLR 925 has an associated area of coverage 920. For the purposes of illustration the area of coverage 910 is associated with the city of Stockholm and the area of coverage 920 is associated with the city of Malmö. If a mobile subscriber located in the area of coverage 910 invokes the service code *22, the MSC/VLR 915 will recognize the service code as corresponding to the bus time table schedule, and will send a USSD message to external node 960, in order to invoke the bus time table application residing in the external node 960, i.e., the bus time table for Stockholm. Similarly, if a mobile subscriber is located in the area of coverage 920 and invokes the service code *22, the MSC/VLR 925 will recognize the service code as corresponding to the bus time table schedule, and will send a USSD message to external node 950, in order to invoke the bus time table application residing in the external node 950, i.e., the bus time table for Malmö. Accordingly, the arrangement in FIG. 9 allows for geographic selective public services through the use of USSD messages.

FIG. 10 illustrates an alternate embodiment of the system illustrated in FIG. 9, wherein only a single external node 1030 contains both the application for providing the bus time tables for Stockholm and the application for providing the bus time tables for Malmö. Accordingly, in order for the external node 1030 to invoke the correct application, some type of geographical information needs to be supplied to the external node 1030. In accordance with a purely exemplary embodiment of the present invention, MSC/VLR 915 and MSC/VLR 925 can supply external node 1030 the GPS coordinates or the cell identification of the base transceiver station associated with the mobile station, in order to invoke the correct application in the external node 1030.

It is also possible to limit users access to certain services. For instance, if the mobile system operator decides to charge for access to the *22 bus time table service, the USSD message can transfer the International Mobile Subscriber Identification (IMSI) number, or alternatively the Mobile Stations ISDN number (MSISDN), which is associated with the subscriber, to the external node. The external node uses the IMSI number or the MSISDN number to determine whether the subscriber is authorized to use the service.

According to exemplary embodiments of the present invention, when using a USSD application located in an external node, the external node could generate charging data records (CDR) for the use of the USSD service. This CDRs are then sent to a billing gateway for billing processing.

The present invention has been described by way of exemplary embodiments to which the invention is not limited. Modifications and changes will occur to those skilled in the art without departing from the spirit and scope of the invention as defined in the appended claims.

What is claimed is:

1. In a mobile communications system including a mobile station in an area associated with an MSC/VLR, a method of routing a USSD message to an external node comprising the steps of:
   sending the USSD message from the mobile station to the MSC/VLR, wherein the USSD message includes a service code not recognized by the mobile station;
   analyzing the USSD message in the MSC/VLR; and
   routing the USSD message from the MSC/VLR to the external node without passing through an HLR.

2. A method in accordance with claim 1, wherein said step of analyzing includes determining whether the USSD message contains an address of the external node, wherein said step of routing includes routing said USSD message in accordance with said address.

3. A method in accordance with claim 1, wherein said step of analyzing further comprises:
    examining a Uniform Resource Locator in said USSD message;
    sending said Uniform Resource Locator to a Domain Name Server; and
    receiving an address of the external node from said Domain Name Server, wherein said step of routing is performed in accordance with said address.

4. A method in accordance with claim 1, further comprising the step of:
    providing, in said MSC/VLR, a database of service codes and corresponding external node addresses.

5. A method, in accordance with claim 4, wherein said step of analyzing further comprises the step of:
    using the service code contained in said USSD message to extract a corresponding external node address from said database.

6. A method, in accordance with claim 4, further comprising the step of:
    transferring, when said mobile station enters said area, at least one service code/external node address pair from an HLR to said MSC/VLR for storage in said database.

7. A method in accordance with claim 1, further comprising the steps of:
    sending an external node address enquiry to a node; and
    returning an address of the external node in an external node address enquiry response, wherein said step of routing is performed in accordance with said address.

8. A method in accordance with claim 7, wherein said node is an HLR.

9. A method in accordance with claim 7, wherein said node is a CAMEL server.

10. A method in accordance with claim 4, wherein the service code is associated with the same external node regardless of the MSC/VLR with which the mobile station is associated.

11. A method in accordance with claim 4, wherein the service code is associated with different external node s depending upon the MSC/VLR with which the mobile station is associated.

12. A method in accordance with claim 10, wherein said USSD message includes information relating to the location of the mobile station.

13. A mobile communications system including a mobile station in a location area associated with an MSC/VLR comprising:
    means for sending a USSD message from the mobile station to the MSC/VLR, wherein the USSD message includes a service code not recognized by the mobile station;
    means for analyzing the USSD message in the MSC/VLR; and
    means for routing the USSD message from the MSC/VLR to an external node without passing through an HLR.

14. A mobile communications system in accordance with claim 13, wherein said means for analyzing includes means for determining whether the USSD message contains an address of the external node, wherein said means for routing includes means for routing said USSD message in accordance with said address.

15. A mobile communications system in accordance with claim 13, wherein said means for analyzing further comprises:
    means for examining a Uniform Resource Locator in said USSD message;
    means for sending said Uniform Resource Locator to a Domain Name Server; and
    means for receiving an address of the external node from said Domain Name Server, wherein said means for routing routes said USSD message in accordance with said address.

16. A mobile communications system in accordance with claim 13, further comprising:
    means for sending an address of the external node to the MSC/VLR in an Insert Subscriber Data command, wherein said means for routing routes said USSD message in accordance with said address.

17. A mobile communications system in accordance with claim 13, further comprising:
    means for sending an external node address enquiry to a node; and
    means for returning an address of the external node in an external node address enquiry response, wherein said means for routing routes said USSD message in accordance with said address.

18. A mobile communications system in accordance with claim 17, wherein said node is an HLR.

19. A mobile communications system in accordance with claim 17, wherein said node is a CAMEL server.

20. A mobile communications system in accordance with claim 13, further comprising:
    means for inserting the service code, at the mobile station, into said USSD message, wherein said means for analyzing includes means for analyzing said service code to determine which external node contains an application which corresponds to said service code.

21. A mobile communications system in accordance with claim 20, wherein the service code is associated with the same external node regardless of the MSC/VLR with which the mobile station is associated with.

22. A mobile communications system in accordance with claim 20, wherein the service code is associated with different external nodes depending upon the MSC/VLR with which the mobile station is associated with.

23. A mobile communication system in accordance with claim 22, wherein said USSD message includes information relating to the location of the mobile station.

24. A method of routing a USSD message to an external node comprising the steps of:
    sending the USSD message from a mobile station to a mobile switching center/visitor location register (MSC/VLR), the USSD message including a service code;
    analyzing the USSD message in the MSC/VLR; and
    routing the USSD message from the MSC/VLR to the external node without passing through a home location register associated with the mobile station, wherein the service code is associated with different external nodes depending upon the MSC/VLR with which the mobile station is associated.

* * * * *